United States Patent
Choi et al.

(10) Patent No.: US 10,191,711 B2
(45) Date of Patent: Jan. 29, 2019

(54) MULTI-DISPLAY APPARATUS

(71) Applicant: Samsung Display Co., Ltd, Yongin-si, Gyeonggi-do (KR)

(72) Inventors: Beohm-Rock Choi, Seoul (KR); Jae-Beom Choi, Suwon-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/385,180

(22) Filed: Dec. 20, 2016

(65) Prior Publication Data

US 2017/0177289 A1    Jun. 22, 2017

(30) Foreign Application Priority Data

Dec. 21, 2015 (KR) ........................ 10-2015-0183107

(51) Int. Cl.
*G06F 3/14* (2006.01)

(52) U.S. Cl.
CPC ................................. *G06F 3/1446* (2013.01)

(58) Field of Classification Search
CPC .... G06F 3/1446; G06F 3/1423; G06F 3/1431; G06F 3/147; G06F 1/1647; G06F 3/14; G06F 1/16; G09G 2300/026; G09G 3/3225; G09G 3/3648; G09G 2300/04; G09G 2300/043; G09G 3/36
See application file for complete search history.

(56) References Cited

U.S. PATENT DOCUMENTS

| | | | |
|---|---|---|---|
| 2005/0140569 A1 | 6/2005 | Sundahl | |
| 2007/0064322 A1* | 3/2007 | Migitaka | B41J 3/407 359/885 |
| 2007/0262916 A1 | 11/2007 | Kee et al. | |
| 2010/0117928 A1* | 5/2010 | Shim | G06F 1/1601 345/1.3 |
| 2011/0025232 A1 | 2/2011 | Kee et al. | |
| 2016/0019019 A1* | 1/2016 | Ikeda | G06F 3/1446 345/173 |
| 2016/0044751 A1* | 2/2016 | Ikeda | H05B 33/02 362/227 |
| 2017/0031643 A1* | 2/2017 | Jeong | G06F 3/1446 |

* cited by examiner

*Primary Examiner* — Md Saiful A Siddiqui
(74) *Attorney, Agent, or Firm* — Innovation Counsel LLP

(57) ABSTRACT

A multi-display apparatus may include a first display panel and a second display panel at least partially overlapping the first display panel. The first display panel may include a first display region in which a plurality of first pixels are disposed, and a first non-display region adjacent to the first display region. The second display panel may include a second display region in which a plurality of second pixels are disposed. The first non-display region may overlap the second display region, and first transmitting windows may be disposed in the first non-display region over the second pixels.

16 Claims, 10 Drawing Sheets

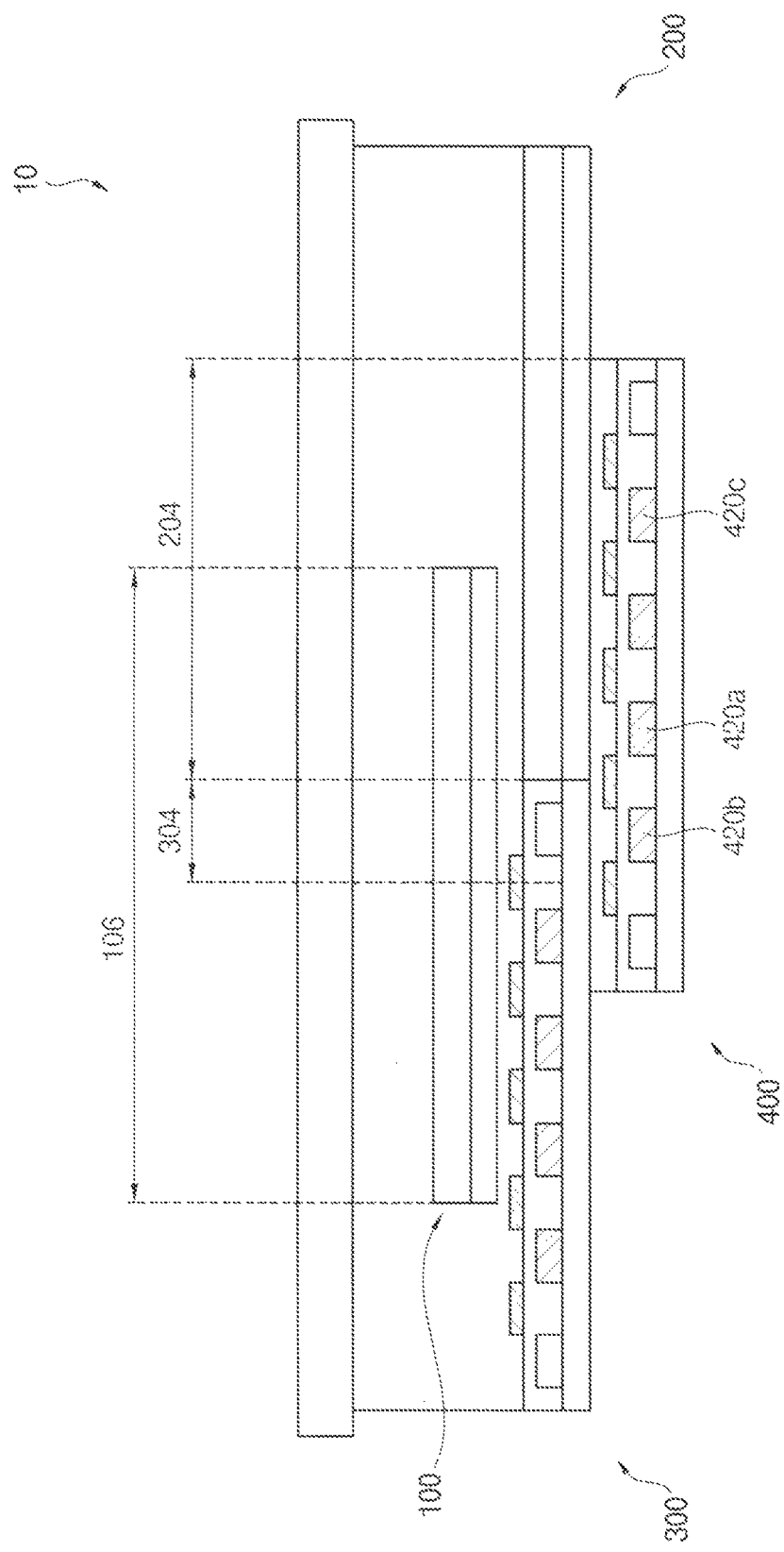

MULTI-DISPLAY APPARATUS

CROSS-REFERENCE TO RELATED APPLICATION(S)

This application claims priority under 35 USC § 119 to Korean Patent Application No. 10-2015-0183107, filed on Dec. 21, 2015 in the Korean Intellectual Property Office (KIPO), the entire disclosure of which is incorporated by reference herein.

BACKGROUND

1. Field

Example embodiments relate to display apparatuses. More particularly, example embodiments relate to multi-display apparatuses including a coupled plurality of display panels to realize a large screen.

2. Description of the Related Art

Generally, a multi-display apparatus may include a plurality of display panels coupled to each other to realize one large screen. A large television for realizing a large screen by connecting a plurality of cathode ray tubes ("CRTs") may be one example of a multi-display apparatus.

A multi-display apparatus may include unit display panels which are generally coupled in a line or as a mosaic shape. That is, a plurality of unit display panels may be disposed in the line or as the mosaic shape to realize a multi-screen. Each of the unit display panels may include a display region disposed in a center portion of the unit display panel and displaying an image, and a non-display region adjacent to and surrounding the display region. Therefore, when the unit display panels are coupled as mentioned above, an image at a joint between two unit display panels may be not smoothly connected or displayed, and may appear disconnected.

SUMMARY

Example embodiments provide a multi-display apparatus including at least two coupled display panels for displaying an image without a disconnection between the display panels.

According to an aspect of example embodiments, a multi-display apparatus may include a first display panel having a first display region in which a plurality of first pixels are disposed, and a first non-display region adjacent to the first display region, and a second display panel having a second display region in which a plurality of second pixels are disposed, the second display panel at least partially overlapping the first display panel. The first non-display region may overlap the second display region, and first transmitting windows may be disposed in the first non-display region over at least some of the plurality of second pixels.

In example embodiments, the multi-display apparatus may further include a window disposed over the first and the second display panels, the window including a transparent substrate. The multi-display apparatus may further include a transparent adhesive member interposed between the window, and the first and the second display panels.

In example embodiments, the first display panel may further include a first substrate on which the plurality of first pixels are disposed, and a first encapsulation layer covering the plurality of first pixels. The second display panel may further include a second substrate on which the plurality of second pixels are disposed, and a second encapsulation layer covering the plurality of second pixels.

In example embodiments, the first display panel may further include a first reflective member that is opaque and does not overlap the plurality of first pixels, the second display panel further includes a second reflective member that is opaque and does not overlap the plurality of second pixels. The window may further include an auxiliary reflective member that is translucent and disposed on the transparent substrate.

In some example embodiments, the first display panel may further include a first light blocking member that does not overlap the plurality of first pixels, and the second display panel may further include a second light blocking member that does not overlap the plurality of second pixels.

In example embodiments, the first display panel may further include a first driver driving the plurality of first pixels, the first driver comprising a plurality of first driving blocks and disposed in the first non-display region, and the plurality of first driving blocks may be located in a portion of the first non-display region in which the first transmitting windows are not disposed.

According to another aspect of example embodiments, a multi-display apparatus may include a first display panel having a first display region in which a plurality of first pixels are disposed, a first non-display region adjacent to the first display region along a first direction, and a second non-display region adjacent to the first display region along a second direction perpendicular to the first direction, a second display panel having a second display region in which a plurality of second pixels are disposed, and a third non-display region adjacent to the second display region along the second direction, the second display panel at least partially overlapping the first display panel, a third display panel having a third display region in which a plurality of third pixels are disposed, and a fourth non-display region adjacent to the third display region along the first direction, the third display panel at least partially overlapping the first display panel, and a fourth display panel having a fourth display region in which a plurality of fourth pixels are disposed, the fourth display panel at least partially overlapping each of the first, the second, and the third display panels. The first non-display region may overlap the second display region, and first transmitting windows may be disposed in the first non-display region over the second pixels. The second non-display region may overlap the third display region, and second transmitting windows may be disposed in the second non-display region over at least some of the plurality of third pixels. The third non-display region may overlap the fourth display region, and third transmitting windows may be disposed in the third non-display region over at least some of the plurality of fourth pixels. The fourth non-display region may overlap the fourth display region, and fourth transmitting windows may be disposed in the fourth non-display region over at least some of the plurality of fourth pixels.

In example embodiments, the multi-display apparatus may further include a window disposed over the first, the second, the third, and the fourth display panels, the window including a transparent substrate. The multi-display apparatus may further include a transparent adhesive member interposed between the window, and the first, the second, the third and the fourth display panels.

In example embodiments, the first display panel may further include a first substrate on which the plurality of first pixels are disposed, and a first encapsulation layer covering the plurality of first pixels. The second display panel may further include a second substrate on which the plurality of second pixels are disposed, and a second encapsulation layer covering the plurality of second pixels. The third display panel may further include a third substrate on which the plurality of third pixels are disposed, and a third encapsulation layer covering the plurality of third pixels. The fourth display panel may further include a fourth substrate on which the plurality of fourth pixels are disposed, and a fourth encapsulation layer covering the plurality of fourth pixels.

In example embodiments, the first display panel may further include a first reflective member that is opaque and does not overlap the plurality of first pixels, the second display panel may further include a second reflective member that is opaque and does not overlap the plurality of second pixels, the third display panel may further include a third reflective member that is opaque and does not overlap the plurality of third pixels, and the fourth display panel may further include a fourth reflective member that is opaque and does not overlap the plurality of fourth pixels. The window may further include an auxiliary reflective member that is translucent and disposed on the transparent substrate.

In some example embodiments, the first display panel may further include a first light blocking member that does not overlap plurality of the first pixels, the second display panel may further include a second light blocking member that does not overlap the plurality of second pixels, the third display panel may further include a third light blocking member that does not overlap the plurality of third pixels, and the fourth display panel may further include a fourth light blocking member that does not overlap the plurality of fourth pixels.

In example embodiments, the first display panel may further include a first driver driving the plurality of first pixels, the first driver comprising a plurality of first driving blocks and disposed in the first non-display region, and the first driving blocks may be located in a portion of the first non-display region in which the first transmitting windows are not disposed. The third display panel may further include a second driver driving the plurality of third pixels, the second driver comprising a plurality of second driving blocks and disposed in the fourth non-display region, and the second driving blocks may be located in a portion of the fourth non-display region in which the fourth transmitting windows are not disposed.

In example embodiments, luminances of some pixels among the plurality of fourth pixels which overlap the second non-display region and the third non-display region or overlap the second non-display region and the fourth non-display region may be greater than luminances of the other pixels among the plurality of fourth pixels.

According to an aspect of example embodiments, the multi-display apparatus may include the first display panel and the second display panel at least partially overlapping the first display panel, and the first transmitting windows may be disposed in a portion of the first display panel where the first display panel overlaps the second display panel, so that images may be displayed on a large screen without a disconnection.

BRIEF DESCRIPTION OF THE DRAWINGS

Illustrative, non-limiting example embodiments will be more clearly understood from the following detailed description taken in conjunction with the accompanying drawings.

FIG. 10 is a cross-sectional view illustrating a multi-display apparatus in accordance with example embodiments.

DETAILED DESCRIPTION OF THE EMBODIMENTS

Hereinafter, multi-display apparatuses in accordance with example embodiments will be explained in detail with reference to the accompanying drawings.

Figure 1:
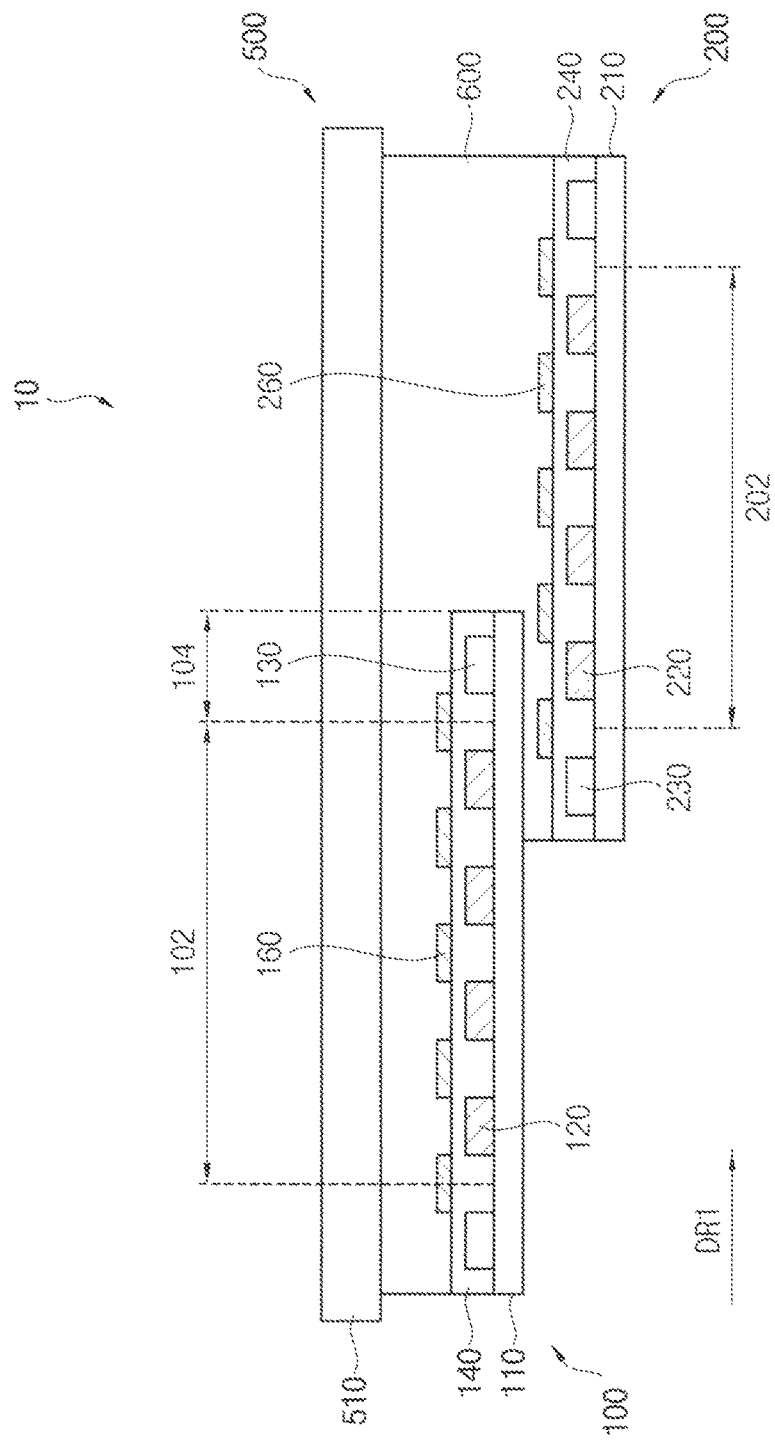
FIG. 1 is a cross-sectional view illustrating a multi-display apparatus in accordance with example embodiments.

FIG. 1 is a cross-sectional view illustrating a multi-display apparatus in accordance with example embodiments.

FIG. 1 illustrates example embodiments of a multi-display apparatus including two coupled display panels, however, example embodiments may be applied to a multi-display apparatus including at least three display panels coupled in a line.

Referring to FIG. 1, a multi-display apparatus 10 may include a first display panel 100, a second display panel 200, a window 500, and a transparent adhesive member 600. Elements of the first display panel 100 may be substantially the same or similar to elements of the second display panel 200, such that the elements of the first display panel 100 may be mainly explained, and detailed descriptions on the elements of the second display panel 200 which are duplicated with the elements of the first display panel 100 may be omitted.

The first display panel 100 may include a first substrate 110, a plurality of first pixels 120, a first driver 130, a first encapsulation layer 140, and a first light blocking member 160. For example, the first display panel 100 may correspond to a flat display panel such as an organic light-emitting display (OLED) panel or a liquid crystal display (LCD) panel.

The first substrate 110 may include a transparent substrate such as a glass substrate, a quartz substrate, a plastic substrate, etc. Alternatively, the first substrate 110 may include a more flexible substrate.

The plurality of first pixels 120 may be disposed on the first substrate 110. For example, the first pixels 120 may be arranged substantially as a matrix structure on the first substrate 110. The plurality of first pixels 120 may be located in a first display region 102 of the first display panel 100 which displays images.

The first driver 130 may be disposed on the first substrate 110. The first driver 130 may be disposed in a peripheral region adjacent to the first display region 102 in which the first pixels 120 are located. For example, the first driver 130 may be located adjacent to the first display region 102 along a first direction DR1 and/or an opposite direction to the first direction DR1. The first driver 130 may be connected to the first pixels 120 through lines. In example embodiments, the first driver 130 may include a scan (or gate) driver sequentially applying scan (or gate) signals to the first pixels 120. The first pixels 120 may display images based on the scan signals applied from the first driver 130.

The first encapsulation layer 140 may be disposed on the first substrate 110 to cover the first pixels 120 and the first driver 130. The first encapsulation layer 140 may prevent diffusion of vapor or oxygen from outside to protect the first pixels 120. In example embodiments, the first encapsulation layer 140 may include at least one organic layer and at least one inorganic layer which are stacked. For example, the first encapsulation layer 140 may include at least two inorganic layers and at least one organic layer. Here, the organic layer may be interposed between the inorganic layers.

The first light blocking member 160 may be disposed on the first encapsulation layer 140. The first light blocking member 160 may include a black matrix and may prevent a leakage of light. The first light blocking member 160 may both be located above and not substantially overlap the first pixels 120. For example, the first light blocking member 160 may have a substantial grid structure to be disposed on the first encapsulation layer 140.

The second display panel 200 may include a second substrate 210, a plurality of second pixels 220, a second driver 230, a second encapsulation layer 240, and a second light blocking member 260.

Coupling the first and the second display panels 100 and 200 may be explained below with reference to FIGS. 2 and 3.

Figure 2:
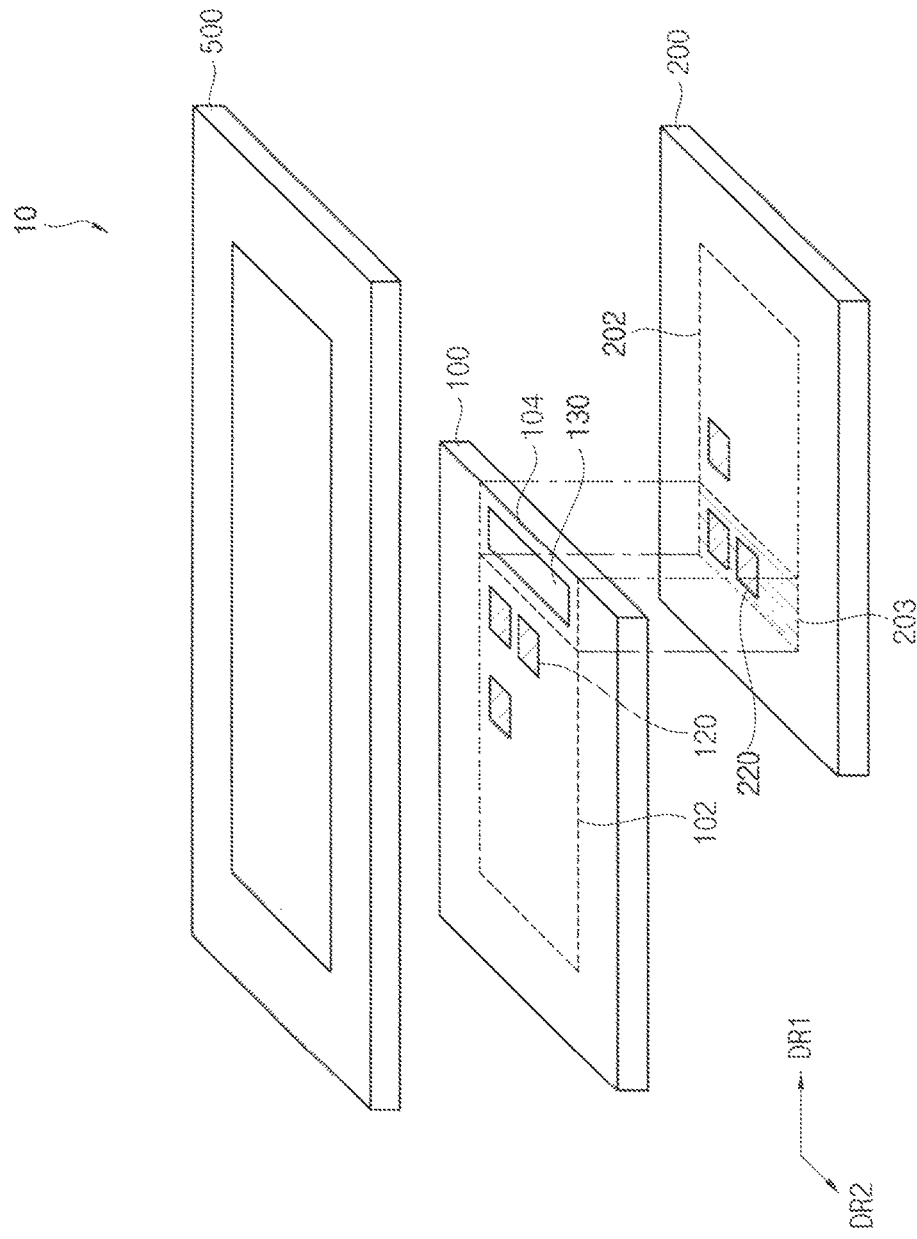
FIG. 2 is a perspective view illustrating a multi-display apparatus in accordance with example embodiments.

FIG. 2 is a perspective view illustrating a multi-display apparatus in accordance with example embodiments. FIG. 3 is a plan view illustrating a multi-display apparatus in accordance with example embodiments.

Figure 3:
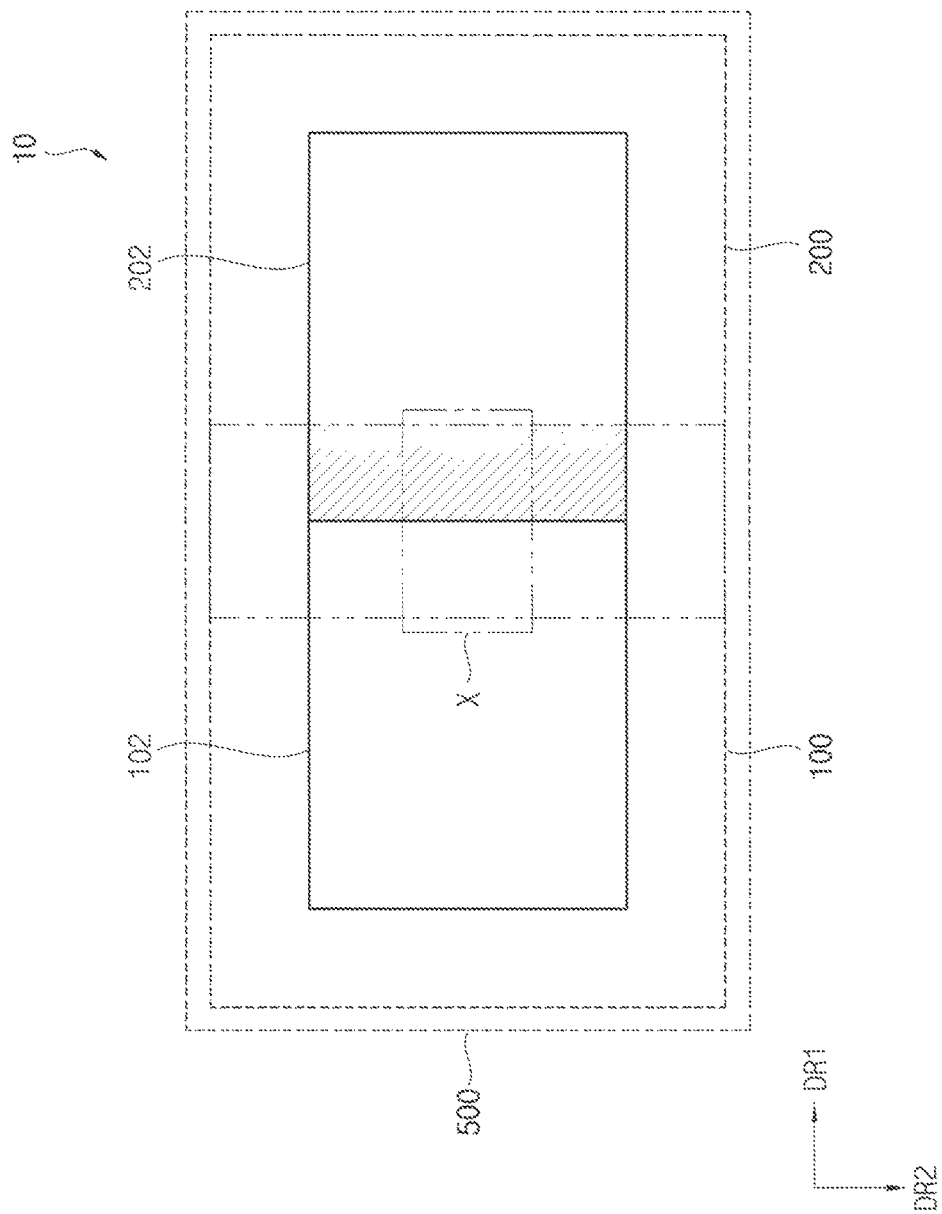
FIG. 3 is a plan view illustrating a multi-display apparatus in accordance with example embodiments.

Referring to FIGS. 2 and 3, the first display panel 100 may include the first display region 102 and a first non-display region 104, and the second display panel 200 may include a second display region 202. The first non-display region 104 is illustrated relatively large in FIGS. 2 and 3 for the convenience of descriptions, however, the first non-display region 104 may be substantially smaller than the first display region 102.

As described above, the plurality of first pixels 120 for displaying images may be disposed in the first display region 102. For example, the first display region 102 may be disposed on a center portion of the first display panel 100. The first non-display region 104 may be adjacent to the first display region 102 along the first direction DR1. The first driver 130 may be disposed in the first non-display region 104.

The plurality of second pixels 220 for displaying images may be disposed in the second display region 202. For example, the second display region 202 may be disposed on a center portion of the second display panel 200.

The second display panel 200 may at least partially overlap the first display panel 100. For example, a portion of the second display panel 200 may be located under a portion of the first display panel 100. Here, the first non-display region 104 of the first display panel 100 may substantially overlap the second display region 202 of the second display panel 200. In other words, as illustrated in FIG. 2, a portion (an overlapped region 203) of the second display region 202 may substantially overlap the first non-display region 104 in which the first driver 130 is located.

In example embodiments, as illustrated in FIG. 3, when users watch the multi-display apparatus 10 from a front side, the first display region 102 and the second display region 202 may be disposed in a line, so that the multi-display apparatus 10 may provide images without a disconnection to the users.

Figure 4:
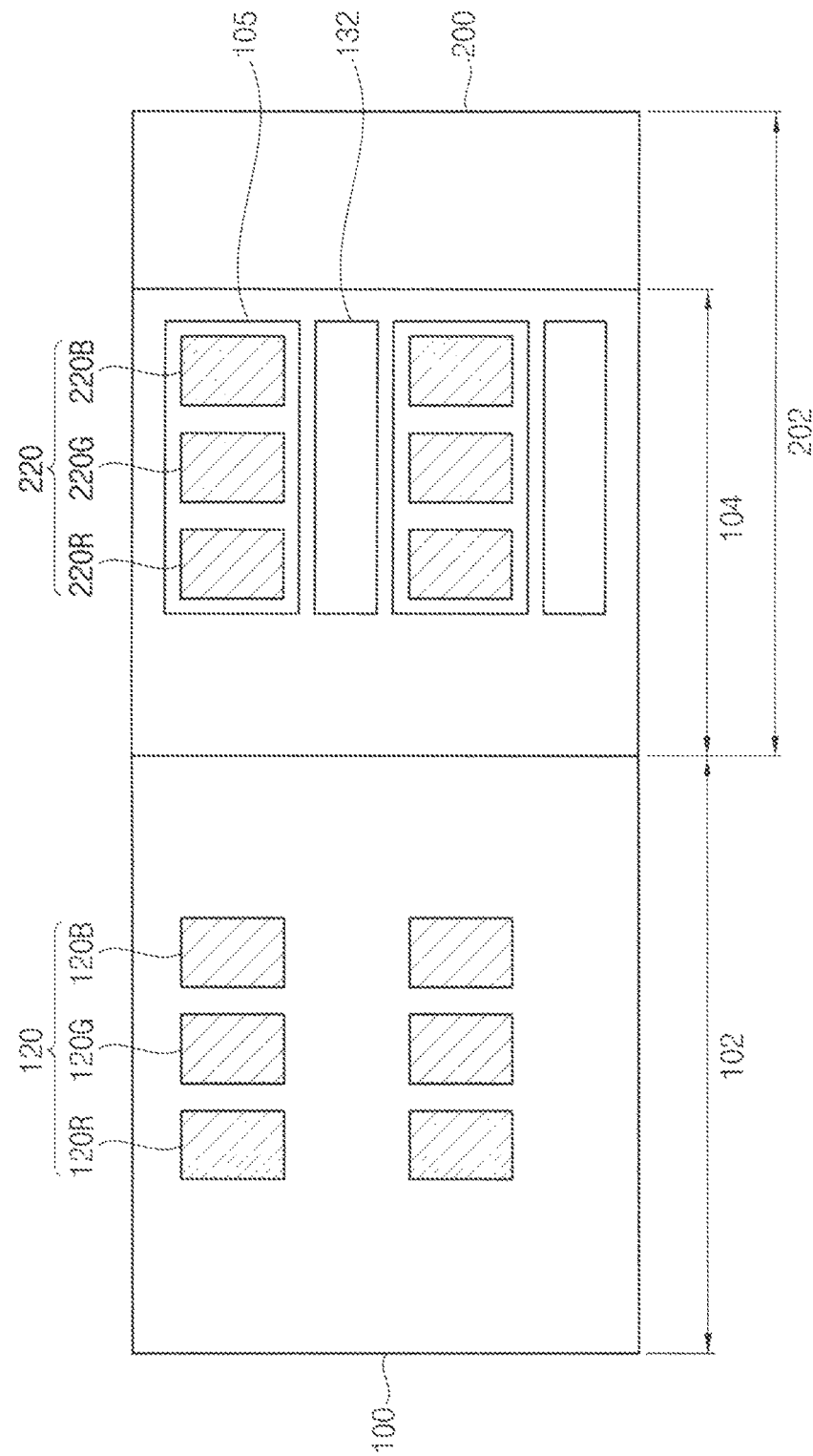
FIG. 4 is a plan view illustrating a portion 'X' of the multi-display apparatus in FIG. 3.

FIG. 4 is a plan view illustrating a portion 'X' of the multi-display apparatus in FIG. 3.

Referring to FIG. 4, the first transmitting windows 105 may be disposed in a region overlapping the second pixels 220 disposed in the second display region 202 of the second display panel 200 among the first non-display region 104 of the first display panel 100. In example embodiments, each of the second pixels 220 may include a second red sub-pixel 220R, a second green sub-pixel 220G, and a second blue sub-pixel 220B, and each of the first transmitting windows 105 may be formed to correspond to each of the second pixels 220. Therefore, light emitted from the second pixels 220 that overlap the first non-display region 104 may pass through the first transmitting windows 105, and the users may perceive images displayed from the second display region 202 of the second display panel 200. The size of each of the first transmitting windows 105 may vary in light of various considerations (e.g., viewing angle).

In example embodiments, the first driver 130 may have a plurality of first driving blocks 132. The first driving blocks 132 may be disposed in a region of the first non-display region 104 in which the first transmitting windows 105 are not disposed. For example, as illustrated in FIG. 4, each of the first driving blocks 132 may be disposed between the first transmitting windows 105. Each of the first driving blocks 132 may be connected to each respective pixel row to apply the scan signals to the first pixels 120. Therefore, although the first driver 130 is disposed in the first non-display region 104, the first driver 130 may not block light emitted from the second pixels 220.

Referring to FIG. 1 again, the window 500 may be disposed over the first and the second display panels 100 and 200, and the window 500 may include a transparent substrate 510. The window 500 may protect the first and the second display panels from external shock. The transparent substrate 510 may include a material substantially the same as or similar to that of the first and the second substrates 110 and 210.

In example embodiments, the window 500 may further include an optical film disposed on the transparent substrate 510. The optical film, for example, may be a polarizing film, an anti-reflection ("AR") film, or an anti-glare ("AG") film. The optical film may be attached to an entirety of a surface of the transparent substrate 510.

The transparent adhesive member 600 may be interposed between the window 500, and the first and the second display panels 100 and 200. The transparent adhesive member 600 may affix the first and the second display panels 100 and 200 to the window 500. The transparent adhesive member 600 may cover an upper face, a side face, and a portion of a lower face of the first display panel 100 and an upper face of the second display panel 200. A refractive index of the transparent adhesive member 600 may be substantially the same as that of the window 500. Therefore, light may be not refracted at an interface between the transparent adhesive member 600 and the window 500.

Figure 5:
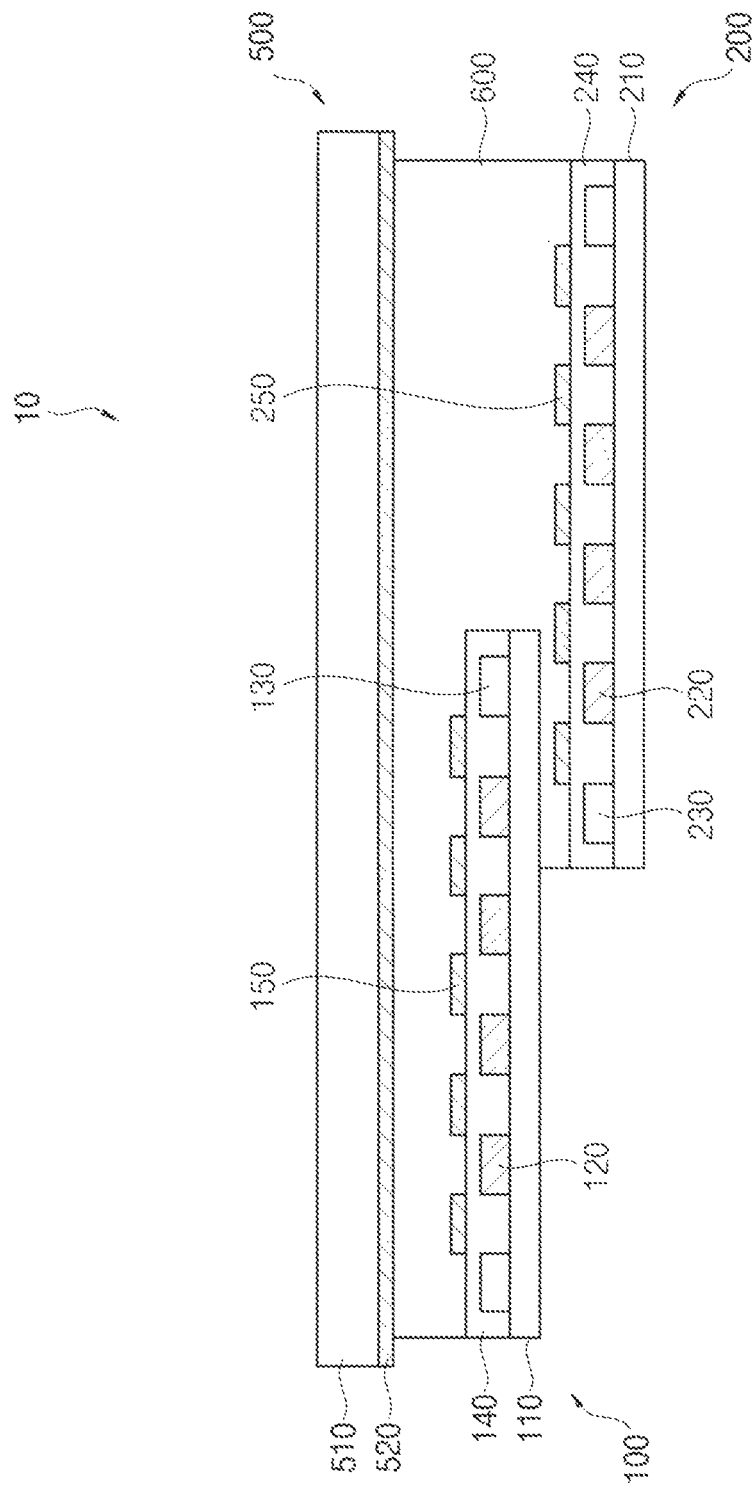
FIG. 5 is a cross-sectional view illustrating a multi-display apparatus in accordance with some example embodiments.

FIG. 5 is a cross-sectional view illustrating a multi-display apparatus in accordance with some example embodiments.

Referring to FIG. 5, the multi-display apparatus 10 may include a first display panel 100, a second display panel 200, a window 500, and a transparent adhesive member 600. Detailed description on elements in FIG. 5 which are substantially the same as or similar to those illustrated with reference to FIGS. 1 to 4 will be omitted.

An opaque first reflective member 150 may be disposed on the first encapsulation layer 140, and an opaque second reflective member 250 may be disposed on the second encapsulation layer 240. The first and the second reflective members 150 and 250 may reflect light which is incident on the multi-display apparatus 10, so that the multi-display apparatus 10 may serve as a mirror display apparatus. The first reflective member 150 and the second reflective member 250 may be located to not overlap the first pixels 120 and the second pixels 220, respectively. For example, the first reflective member 150 and the second reflective member 250 may have substantial grid structures to be located on the first encapsulation layer 140 and the second encapsulation layer 240, respectively. For example, each of the first and the second reflective members 150 and 250 may include aluminum (Al), silver (Ag), gold (Au), platinum (Pt), nickel (Ni), copper (Cu), and/or tungsten (W).

A translucent auxiliary reflective member 520 may be disposed on the transparent substrate 510. The auxiliary reflective member 520 may transmit some rays of external light which is incident on the multi-display apparatus 10 and display light emitted from the multi-display apparatus 10, and may reflect the other rays of the external light and the display light. The auxiliary reflective member 520 may improve a reflective property of the multi-display apparatus 10. For example, the auxiliary reflective member 520 may include silver (Ag) and/or indium tin oxide (ITO).

Figure 6:
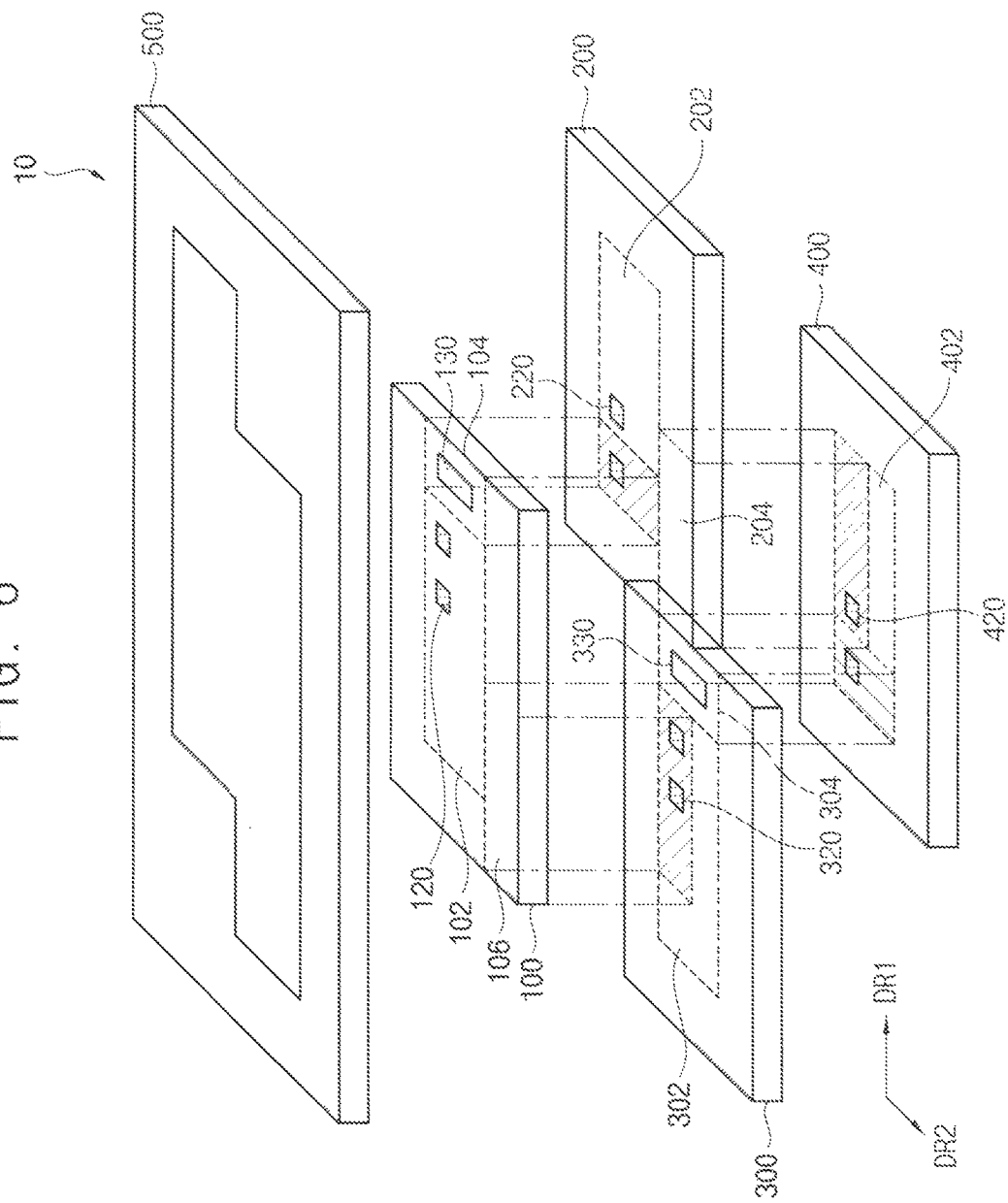
FIG. 6 is a perspective view illustrating a multi-display apparatus in accordance with example embodiments.
Figure 7:
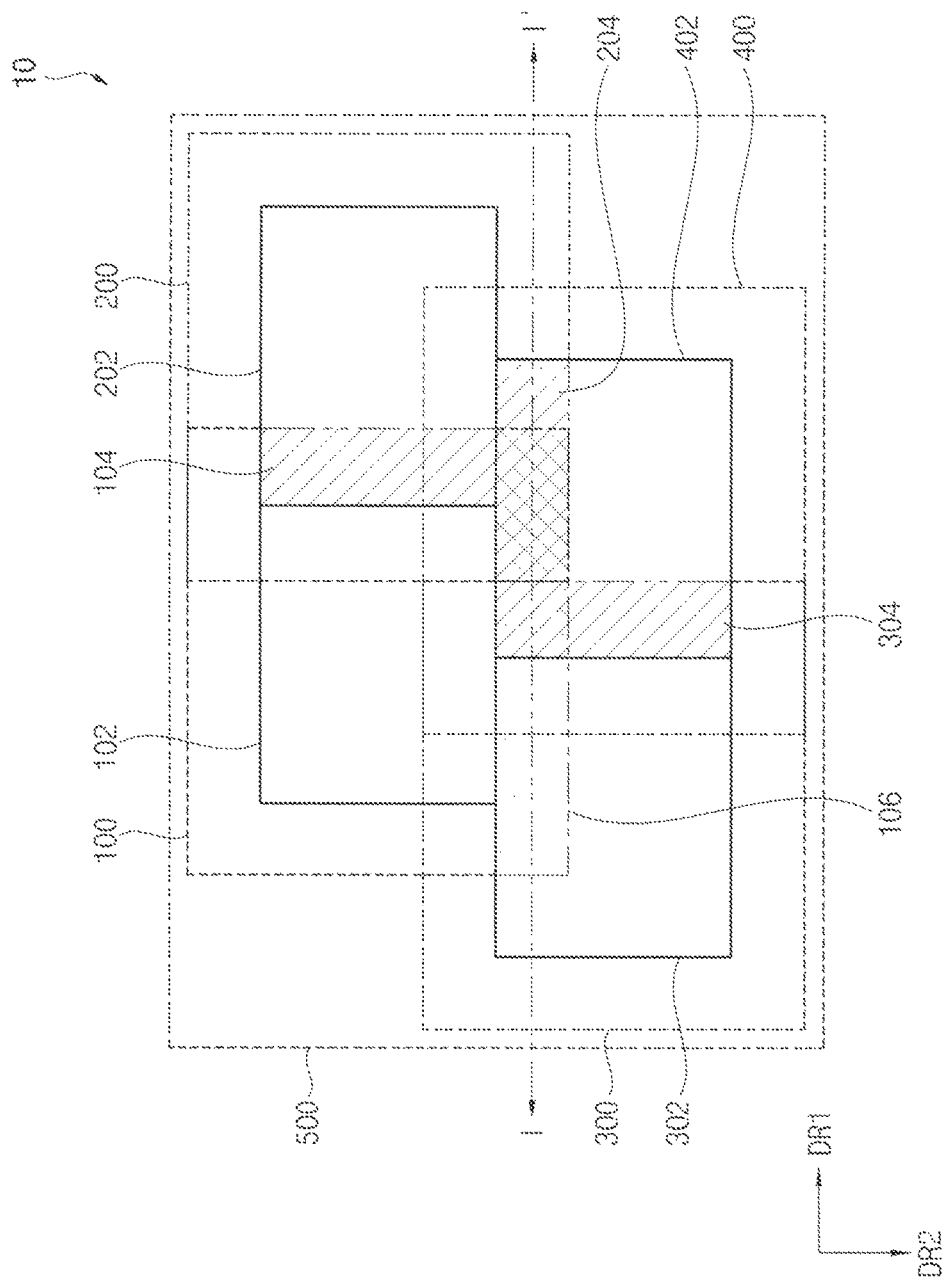
FIG. 7 is a plan view illustrating a multi-display apparatus in accordance with example embodiments.

FIG. 6 is a perspective view illustrating a multi-display apparatus in accordance with example embodiments. FIG. 7 is a plan view illustrating a multi-display apparatus in accordance with example embodiments.

FIGS. 6 and 7 illustrate example embodiments of a multi-display apparatus including four coupled display panels, however, example embodiments may be applied to a multi-display apparatus including at least six display panels coupled as a mosaic shape.

Referring to FIGS. 6 and 7, a multi-display apparatus 10 may include a first display panel 100, a second display panel 200, a third display panel 300, a fourth display panel 400, a window 500, and a transparent adhesive member 600. Elements of the first display panel 100, the second display panel 200, the third display panel 300, and the fourth display panel 400 may be substantially the same or similar. Detailed description on elements in FIGS. 6 and 7 which are substantially the same as or similar to those illustrated with reference to FIGS. 1 to 5 will be omitted.

Coupling the first through the fourth display panels 100 through 400 may be explained below with reference to FIGS. 6 and 7.

As illustrated in FIG. 6, the first display panel 100 may include a first display region 102, a first non-display region 104, and a second non-display region 106, the second display panel 200 may include a second display region 202 and a third non-display region 204, the third display panel 300 may include a third display region 302 and a fourth non-display region 304, and the fourth display panel 400 may include a fourth display region 402.

A plurality of first pixels 120 for displaying images may be disposed in the first display region 102. The first non-display region 104 may be adjacent to the first display region 102 along a first direction DR1. A first driver 130 may be disposed in the first non-display region 104. The second non-display region 106 may be adjacent to the first display region 102 along a second direction DR2 substantially perpendicular to the first direction DR1.

A plurality of second pixels 220 for displaying images may be disposed in the second display region 202. The third non-display region 204 may be adjacent to the second display region 202 along the second direction DR2.

A plurality of third pixels 320 for displaying images may be disposed in the third display region 302. The fourth non-display region 304 may be adjacent to the third display region 302 along the first direction DR1. A second driver 330 may be disposed in the fourth non-display region 304.

A plurality of fourth pixels 420 for display images may be disposed in the fourth display region 402.

The second display panel 200 may at least partially overlap the first display panel 100. The third display panel 300 may at least partially overlap the first display panel 100. The fourth display panel 400 may at least partially overlap the first, the second, and the third display panels 100, 200, and 300.

In example embodiments, the second and the third display panels 200 and 300 may be disposed at substantially the same level under the first display panel 100, a portion of the second display panel 200 may be located under a portion of the first display panel 100, and a portion of the third display panel 300 may be located under another portion of the first display panel 100. Here, the first non-display region 104 of the first display panel 100 may substantially overlap the second display region 202 of the second display panel 200, and the second non-display region 106 of the first display panel 100 may substantially overlap the third display region 302 of the third display panel 300. In other words, a portion (a shaded region) of the second display region 202 may substantially overlap the first non-display region 104, and a portion (a shaded region) of the third display region 302 may substantially overlap the second non-display region 106.

Furthermore, the fourth display panel 400 may be disposed under the second and the third display panels 200 and 300, a portion of the second display panel 200 may be located over a portion of the fourth display panel 400, and a portion of the third display panel 300 may be located over another portion of the fourth display panel 400. Here, the third non-display region 204 of the second display panel 200 may substantially overlap the fourth display region 402 of the fourth display panel 400, and the fourth non-display region 304 of the third display panel 300 may substantially overlap the fourth display region 402 of the fourth display panel 400. In other words, a portion (a shaded region) of the fourth display region 402 may substantially overlap the third non-display region 204, and another portion (a shaded region) of the fourth display region 402 may substantially overlap the fourth non-display region 304.

In this case, as illustrated in FIG. 7, when users watch the multi-display apparatus 10 from a front side, the first display region 102 and the second display region 202 may be disposed side by side, the third display region 302 and the fourth display region 402 may be disposed side by side, and the first and the second display regions 102 and 202, and the third and the fourth display regions 302 and 402 may be disposed up and down. Therefore, the multi-display apparatus 10 may provide images without a disconnection perceived by the users.

A portion of an image displayed from the second display region 202 may be covered by an overlapped region of the first non-display region 104, a portion of an image displayed from the third display region 302 may be covered by an overlapped region of the second non-display region 106, and a portion of an image displayed from the fourth display region 402 may be covered by an overlapped region of the second through the fourth non-display regions 106, 204 and 304.

Figure 8:
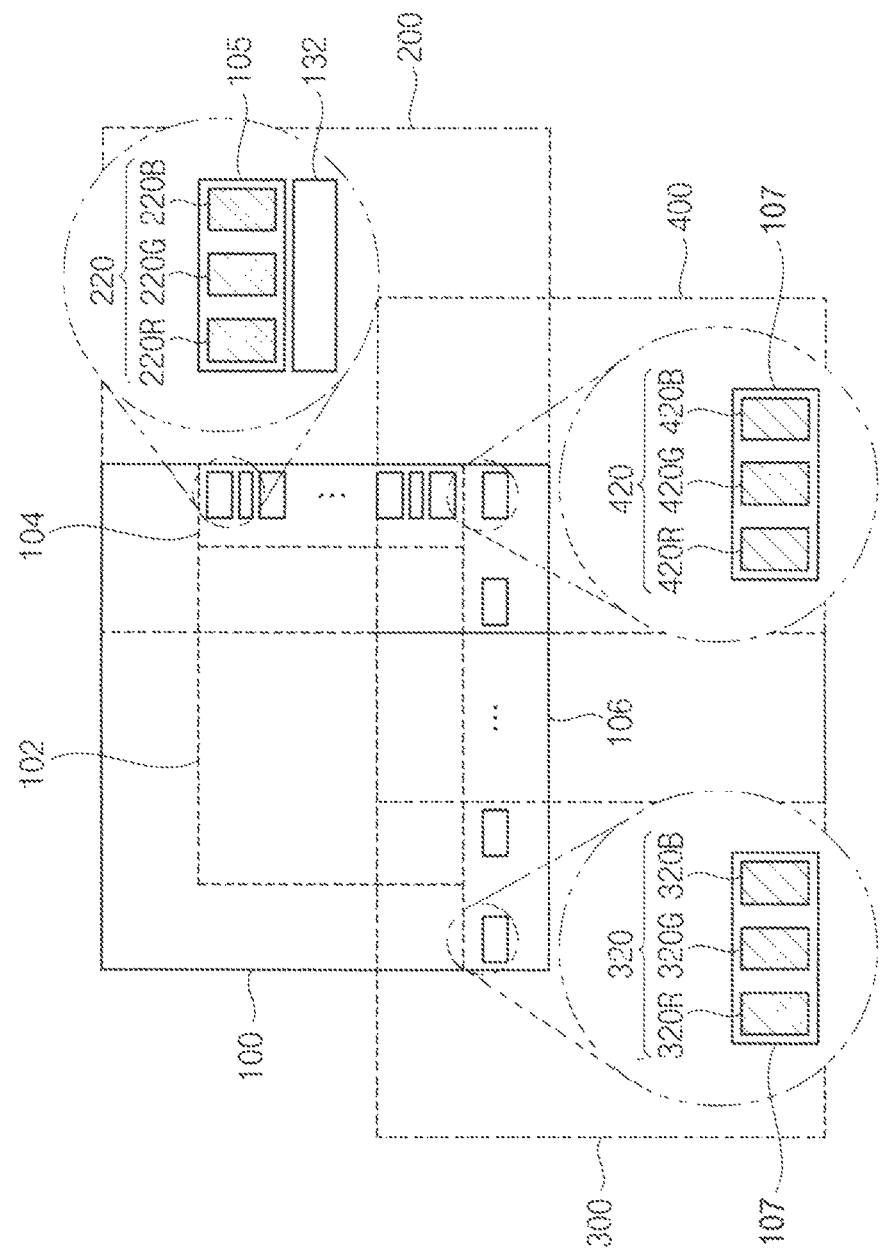
FIGS. 8 and 9 are plan views illustrating a multi-display apparatus in accordance with example embodiments.
Figure 9:
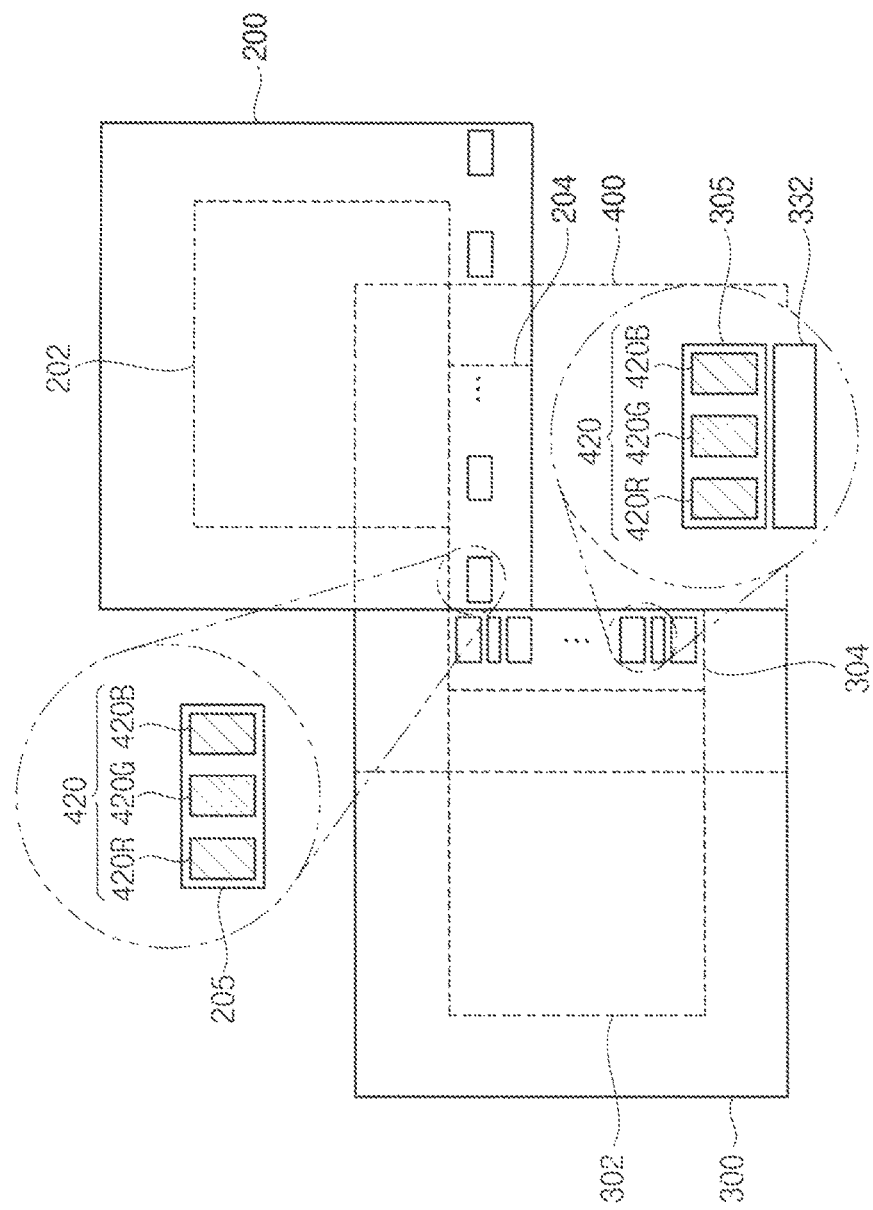

FIGS. 8 and 9 are plan views illustrating a multi-display apparatus in accordance with example embodiments. FIG. 8 illustrates first transmitting windows 105, second transmitting windows 107, and first driving blocks 132 which are disposed on the first display panel 100. FIG. 9 illustrates third transmitting windows 205 disposed on the second display panel 200, and fourth transmitting windows 305 and second driving blocks 332 which are disposed on the third display panel 300.

Referring to FIG. 8, the first transmitting windows 105 may be disposed in a region overlapping the second pixels 220 among the first non-display region 104, and the second transmitting windows 107 may be disposed in a region overlapping the third pixels 320 and the fourth pixels 420 among the second non-display region 106. Referring to FIG. 9, the third transmitting windows 205 may be disposed in a region overlapping the fourth pixels 420 among the third non-display region 204, and the fourth transmitting windows 305 may be disposed in a region overlapping the fourth pixels 420 among the fourth non-display region 304. Therefore, light emitted from the second pixels 220 that overlap the first non-display region 104 may pass through the first transmitting windows 105, light emitted from the third pixels 320 that overlap the second non-display region 106 may pass through the second transmitting windows 107, and light emitted from the fourth pixels 420 that overlap the second through the fourth non-display regions 106, 204 and 304 may pass through the first through the fourth transmitting windows 107, 205 and 305. So, the users may recognize images displayed from the second through the fourth display regions 202, 302 and 402. The size of each of the first through the fourth transmitting windows 105, 107, 205 and 305 may vary in light of various considerations (e.g., viewing angle).

In example embodiments, the first driver 130 may have a plurality of first driving blocks 132, and the first driving blocks 132 may be disposed in a region of the first non-display region 104 in which the first transmitting windows 105 are not disposed. The second driver 330 may have a plurality of second driving blocks 332, and the second driving blocks 332 may be disposed in a region of the fourth non-display region 304 in which the fourth transmitting windows 305 are not disposed. For example, each of the first driving blocks 132 may be disposed between the first transmitting windows 105, and each of the second driving blocks 332 may be disposed between the fourth transmitting windows 305. Therefore, although the first driver 130 is disposed in the first non-display region 104, the first driver 130 may not block light emitted from the second pixels 220. Moreover, although the second driver 330 is disposed in the fourth non-display region 304, the second driver 330 may not block light emitted from the fourth pixels 420.

FIG. 10 is a cross-sectional view illustrating a multi-display apparatus in accordance with example embodiments. For example, FIG. 10 is a cross-sectional view taken along a line I-I' in FIG. 7.

Referring to FIG. 10, luminances of some pixels among the fourth pixels 420 which overlap the second non-display region 106 and the third non-display region 204 or overlap the second non-display region 106 and the fourth non-display region 304 are substantially greater than luminances of the other pixels among the fourth pixels 420. Light emitted from first ones of the fourth pixels 420a overlapping the second non-display region 106 and the third non-display region 204 among the fourth pixels 420 may pass through the first display panel 100 and the second display panel 200, and light emitted from second ones of the fourth pixels 420b overlapping the second non-display region 106 and the fourth non-display region 304 among the fourth pixels 420 may pass through the first display panel 100 and the third display panel 300, so that the light emitted from the first ones and the second ones of the fourth pixels 420a and 420b must pass through more elements than light that is emitted from third ones of the fourth pixels 420c overlapping the third non-display region 204 among the fourth pixels 420, and passes through the second display panel 200 only. Therefore, by applying a current or voltage to the first ones and the second ones of fourth pixels 420a and 420b, the current or voltage being substantially greater than that applied to the third ones of fourth pixels 420c, the luminances of the first ones and the second ones of the fourth pixels 420a and 420b may be increased so that the perceived luminances of all pixels to users may be substantially uniform throughout an entire surface of the multi-display apparatus 10.

The multi-display apparatus according to example embodiments may be applied to various electronic devices. For example, the multi-display apparatus may be applied to televisions, computers, notebooks, smart pads, personal media players, etc.

Although a few example embodiments have been described, those skilled in the art will readily appreciate that many modifications are possible in the example embodiments without materially departing from the novel teachings and advantages of the present inventive concept.

What is claimed is:

1. A multi-display apparatus, comprising:
a first display panel having a first display region in which a plurality of first pixels are disposed, and a first non-display region adjacent to the first display region; and
a second display panel having a second display region in which a plurality of second pixels are disposed, the second display panel at least partially overlapping the first display panel,
wherein the first non-display region overlaps the second display region, and each of first transmitting windows are disposed in the first non-display region over at least one of the plurality of second pixels,
the first display panel further includes a first driver driving the plurality of first pixels, the first driver comprising a plurality of first driving blocks and disposed in the first non-display region,
the plurality of first driving blocks located in a portion of the first non-display region in which the first transmitting windows are not disposed, and
each of the first driving blocks overlap the second display region and are disposed between at least two of the first transmitting windows, and each of the first driving blocks are connected to a respective pixel row to apply scan signals to at least some of the plurality of first pixels.

2. The multi-display apparatus of claim 1, further comprising:
a window disposed over the first and the second display panels, the window including a transparent substrate.

3. The multi-display apparatus of claim 2, further comprising:
a transparent adhesive member interposed between the window and the first and the second display panels.

4. The multi-display apparatus of claim 2, wherein the first display panel further includes a first substrate on which the plurality of first pixels are disposed, and a first encapsulation layer covering the plurality of first pixels, and the second display panel further includes a second substrate on which the plurality of second pixels are disposed, and a second encapsulation layer covering the plurality of second pixels.

5. The multi-display apparatus of claim 4, wherein the first display panel further includes a first reflective member that is opaque and does not overlap the plurality of first pixels, and the second display panel further includes a second reflective member that is opaque and does not overlap the plurality of second pixels.

6. The multi-display apparatus of claim 5, wherein the window further includes an auxiliary reflective member that is translucent and disposed on the transparent substrate.

7. The multi-display apparatus of claim 4, wherein the first display panel further includes a first light blocking member that does not overlap the plurality of first pixels, and the second display panel further includes a second light blocking member that does not overlap the plurality of second pixels.

8. A multi-display apparatus, comprising:

a first display panel having a first display region in which a plurality of first pixels are disposed, a first non-display region adjacent to the first display region along a first direction, and a second non-display region adjacent to the first display region along a second direction perpendicular to the first direction;

a second display panel having a second display region in which a plurality of second pixels are disposed, and a third non-display region adjacent to the second display region along the second direction, the second display panel at least partially overlapping the first display panel;

a third display panel having a third display region in which a plurality of third pixels are disposed, and a fourth non-display region adjacent to the third display region along the first direction, the third display panel at least partially overlapping the first display panel; and a fourth display panel having a fourth display region in which a plurality of fourth pixels are disposed, the fourth display panel at least partially overlapping each of the first, the second, and the third display panels, wherein the first non-display region overlaps the second display region, and each of first transmitting windows are disposed in the first non-display region over at least one of the plurality of second pixels, the second non-display region overlaps the third display region, and each of second transmitting windows are disposed in the second non-display region over at least one of the plurality of third pixels, the third non-display region overlaps the fourth display region, and each of third transmitting windows are disposed in the third non-display region over at least one of the plurality of fourth pixels, and the fourth non-display region overlaps the fourth display region, and each of fourth transmitting windows are disposed in the fourth non-display region over at least one of the plurality of fourth pixels.

9. The multi-display apparatus of claim 8, wherein the first display panel further includes a first driver driving the plurality of first pixels, the first driver comprising a plurality of first driving blocks and disposed in the first non-display region, the first driving blocks located in a portion of the first non-display region in which the first transmitting windows are not disposed, the third display panel further includes a second driver driving the plurality of third pixels, the second driver comprising a plurality of second driving blocks and disposed in the fourth non-display region, and the second driving blocks located in a portion of the fourth non-display region in which the fourth transmitting windows are not disposed.

10. The multi-display apparatus of claim 8, wherein luminances of some pixels among the plurality of fourth pixels which overlap the second non-display region and the third non-display region or overlap the second non-display region and the fourth non-display region are greater than luminances of the other pixels among the plurality of fourth pixels.

11. The multi-display apparatus of claim 8, further comprising:

a window disposed over the first, the second, the third, and the fourth display panels, the window including a transparent substrate.

12. The multi-display apparatus of claim 11, wherein the first display panel further includes a first substrate on which the plurality of first pixels are disposed, and a first encapsulation layer covering the plurality of first pixels, the second display panel further includes a second substrate on which the plurality of second pixels are disposed, and a second encapsulation layer covering the plurality of second pixels, the third display panel further includes a third substrate on which the plurality of third pixels are disposed, and a third encapsulation layer covering the plurality of third pixels, and the fourth display panel further includes a fourth substrate on which the plurality of fourth pixels are disposed, and a fourth encapsulation layer covering the plurality of fourth pixels.

13. The multi-display apparatus of claim 12, wherein the first display panel further includes a first reflective member that is opaque and does not overlap the plurality of first pixels, the second display panel further includes a second reflective member that is opaque and does not overlap the plurality of second pixels, the third display panel further includes a third reflective member that is opaque and does not overlap the plurality of third pixels, and the fourth display panel further includes a fourth reflective member that is opaque and does not overlap the plurality of fourth pixels.

14. The multi-display apparatus of claim 13, wherein the window further includes an auxiliary reflective member that is translucent and disposed on the transparent substrate.

15. The multi-display apparatus of claim 12, wherein the first display panel further includes a first light blocking member that does not overlap the plurality of first pixels, the second display panel further includes a second light blocking member that does not overlap the plurality of second pixels, the third display panel further includes a third light blocking member that does not overlap the plurality of third pixels, and the fourth display panel further includes a fourth light blocking member that does not overlap the plurality of fourth pixels.

16. The multi-display apparatus of claim 11, further comprising:
a transparent adhesive member interposed between the window and the first, the second, the third and the fourth display panels.

* * * * *